Figure 1:
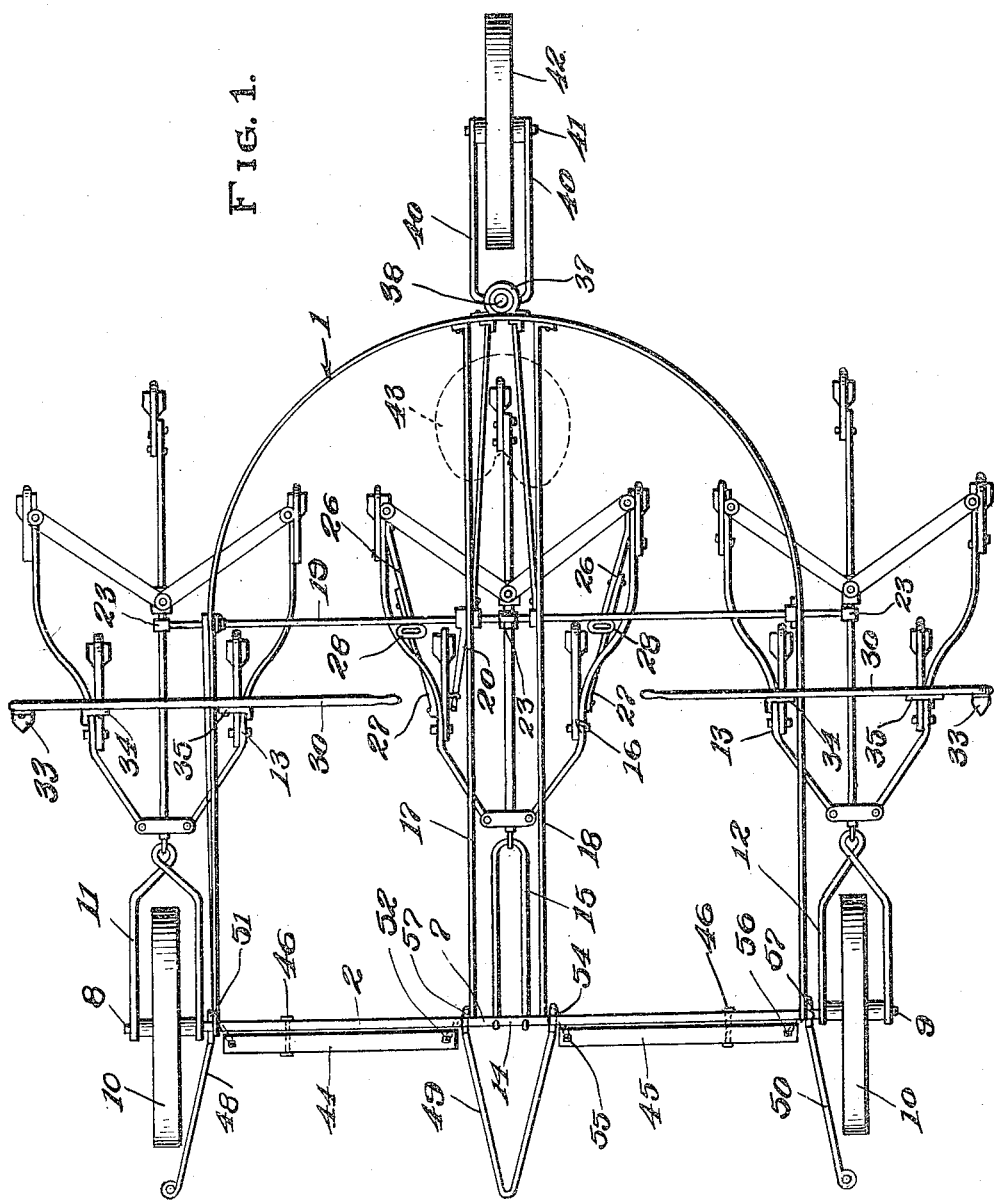

H. E. VANDERLIP.
AGRICULTURAL IMPLEMENT FRAME.
APPLICATION FILED MAR. 24, 1916.
1,259,174.
Patented Mar. 12, 1918.
2 SHEETS—SHEET 2.
Fig. 2.
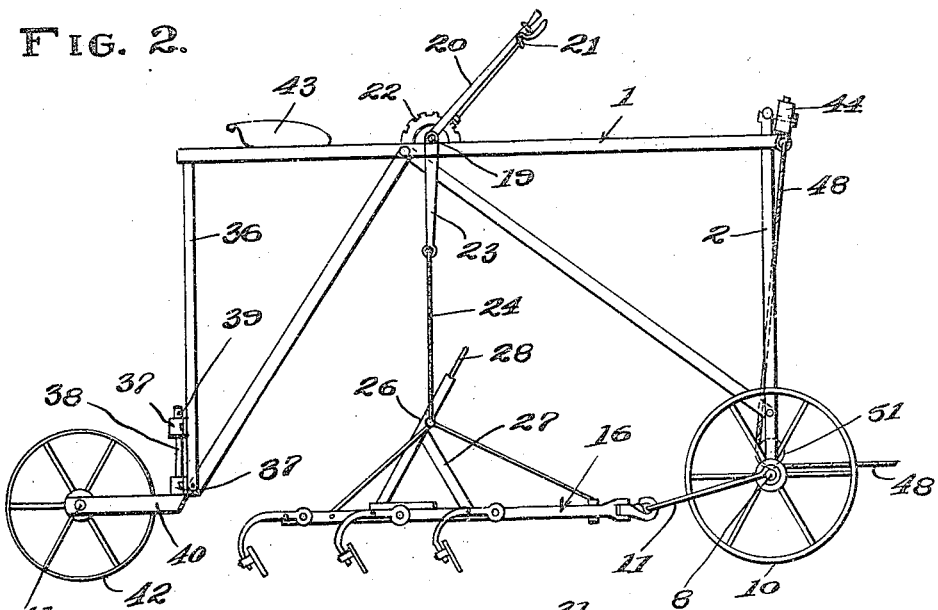
Fig. 3.
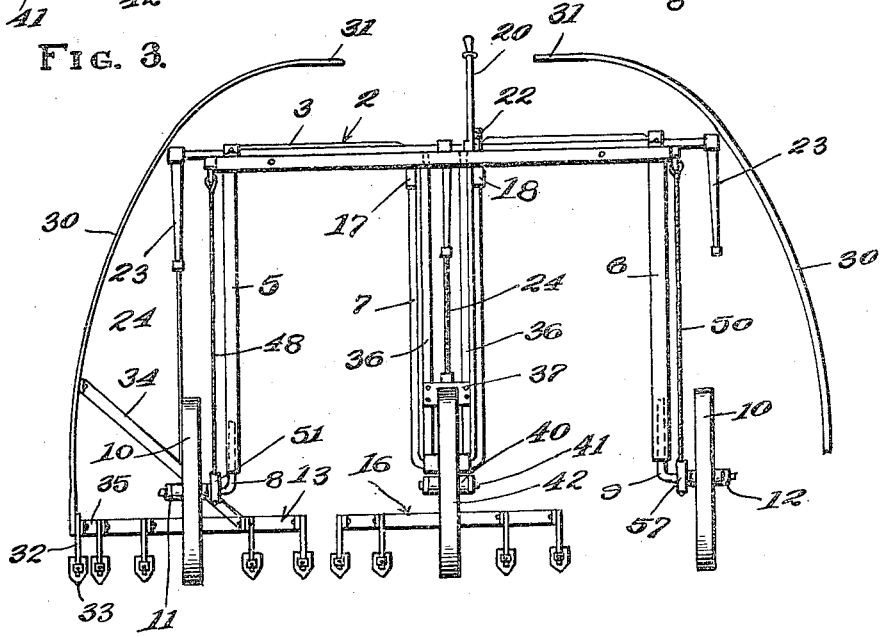
Inventor
H. E. VANDERLIP.
Witness
By
Attorney

UNITED STATES PATENT OFFICE.

HARRY E. VANDERLIP, OF WOODSTON, KANSAS.

AGRICULTURAL-IMPLEMENT FRAME.

1,259,174.  Specification of Letters Patent.  Patented Mar. 12, 1918.

Application filed March 24, 1916. Serial No. 86,425.

*To all whom it may concern:*

Be it known that I, HARRY E. VANDERLIP, a citizen of the United States, residing at Woodston, in the county of Rooks and State of Kansas, have invented certain new and useful Improvements in Agricultural-Implement Frames; and I do hereby declare the following to be a full, clear, and exact description of the invention, such as will enable others skilled in the art to which it appertains to make and use the same.

This invention relates to agricultural implements, and the primary object of the invention is to provide a frame-work for an agricultural implement, which framework is adapted for supporting cultivating plows or grain feeders, and the primary object of the invention is to provide a framework as specified, which is adapted for facilitating the planting of wheat, or analogous grain in a corn field.

Another object of this invention is to provide means included in the frame structure for equalizing the draft of a three horse team which may be hooked or hitched to the frame.

Another object of this invention is to provide a frame as specified which is constructed for permitting of the connection thereto of three or more agricultural implements, and to provide means for raising or lowering these agricultural implements into or out of operative position, and also means for controlling each implement independent of the other.

With the foregoing and other objects in view, the invention consists in such novel features of construction, combination and arrangement of parts as will be hereinafter more fully described, illustrated in the accompanying drawings, and claimed.

In describing the invention in detail reference will be had to the accompanying drawings wherein like characters designate like and corresponding parts throughout the several views, and in which:

Figure 1 is a top plan view of the improved agricultural implement frame, showing cultivators attached thereto, Fig. 2 is a side elevation of the agricultural implement, Fig. 3 is a rear elevation, showing parts broken away.

Referring more particularly to the drawings, 1 designates the main supporting frame of the agricultural implement, which frame is substantially U-shaped in plan, and has its forward ends connected to an axle structure 2.

The axle structure 2 comprises a rod, which is bent to form two upper horizontal portions 3 and 4, and outer vertical standards 5 and 6. The axle structure is bent intermediate its vertical standards 5 and 6 to form a depending U-shaped structure 7. The standards 5 and 6 of the U-shaped axle structure have angled axles 8 and 9, rotatably connected thereto, upon the horizontal portions of which axles are mounted supporting wheels 10. The horizontal portions of the axles 8 and 9 also have the arms of yokes 11 and 12 connected thereto, respectively. The yokes 11 and 12 extend rearwardly of the axle and are adapted for connection with cultivators, as indicated at 13, in the drawings, or with ordinary grain or wheat drills as desired. The lower horizontal portion 14 of the U-shaped portion 7, has a yoke 15 connected thereto, to the rear end of which is connected a cultivator structure 16. The cultivator structures 13 and 16 may be of any ordinary desired type, and, if it is so desired, a grain drill may be connected to the yoke 15 in lieu of the cultivator 16.

The frame 1 has a pair of longitudinally extending bars 17 and 18 connected thereto, at substantially the center of the frame, which bars extend from the rear end of the frame to the front end, as is clearly shown in Fig. 1 of the drawings. The bars 17 and 18 have a rock shaft 19 rotatably supported thereby, which rock shaft is also supported by the sides of the frame 1. A hand lever 20 is mounted upon the rock shaft 19, and it has a dog mechanism 21 carried thereby, which co-acts with a quadrant 22 for holding the lever in adjusted positions. The lever 20 is provided for rocking the shaft 19. A plurality of arms 23 are connected to and depend from the shaft 19 and they have flexible members 24 connected to their lower ends, which flexible members are in turn connected to the cultivators 15 and 16 or to the agricultural implements which are attached to the frame. The arms 23 and the flexible members 24 are provided for raising or lowering the agricultural implements, such as cultivators or the like, into or out of operative position upon operation of the hand lever 20.

The cultivator structure 16 has foot levers 26 connected thereto, which extend upwardly therefrom and are braced by suitable braces 27. The foot levers 26 have sockets 28 formed upon their upper ends for receiving the feet of the operator. The foot levers 26 are provided for permitting of lateral adjustment of the cultivator or agricultural implement, independent of the cultivators or agricultural implements which are connected to the yokes 11 and 12.

The agricultural implements, which are connected to the yokes 11 and 12, are moved laterally independent of each other and also independent of the agricultural implement which is connected to the yoke 15 by hand levers 30, which extend upwardly over the top of the frame and have hand grips 31 formed upon their upper ends. The levers 30 extend downwardly to the frames of the agricultural implement and have double standards 32 connected to their lower ends, upon which are mounted cultivating shovels 33, when ordinary cultivators are used in connection with a frame. When grain drills are used with the frame, the standards 32 and the shovels 33 are disconnected from the levers 30. The hand levers 30 are connected to the frame of the agricultural implement by braces 34 and 35, so that by the manipulation of the hand levers the agricultural implements may be moved laterally independent of each other and also of the central agricultural implement 16.

A frame 1 has an auxiliary frame 36 connected to the rear end of the same and extending downwardly therefrom, which auxiliary frame has a pair of supporting brackets 37 attached to its rear surface adjacent its lower end. The supporting brackets 37 rotatably support a vertical shaft 38, the vertical movement of which is limited by a pin 39. The shaft 38 has an axle-supporting fork 40 connected to its lower end, which rotatably supports an axle 41, upon which is mounted a supporting wheel 42. The supporting wheel 42 is mounted centrally of the frame at the rear of the same.

A seat 43, of the ordinary construction, is attached to the braces.

A pair of draft evener bars 44 and 45 are pivotally connected by means of bolts, shown at 46, to the front axle structure 2. The pivot bolts of the eveners are positioned so that substantially two-thirds of the evener bars extend inwardly from their pivotal points, while one-third extends outwardly. This is provided for equalizing the draft of the agricultural implement. Flexible members, such as cables, chains, or the like, 48, 49 and 50 are provided. The flexible member 48 is attached to the outer end of the evener bar 44 and it extends downwardly and about a pulley 51, which is carried by the arch axle 8, and it extends forwardly over the pulley 51 for attachment to an ordinary swingle-tree. The flexible member 49 has one end connected to the inner end of the evener bar 44, as shown at 52, and it extends downwardly and passes about a pulley 53, which is carried by the horizontal portion 14 of the U-shaped member 6, outwardly therefrom, as clearly shown in Fig. 1 of the drawings, and returns to and passes about a pulley 54, which is also carried by the horizontal portion 14. The flexible member 49 extends upwardly from the pulley 54 and is connected to the inner end of the evener bar 45, as is shown at 55. The flexible member 50 is connected with the outer end of the evener bar 45, as shown at 56, and it passes downwardly about a pulley 57, which is carried by the stub axle 9, extending forwardly therefrom for attachment to a swingle-tree.

In the operation of the improved agricultural implement structure or frame, when it is desired to sow a field of standing corn with wheat, or similar grain, cultivators are first attached to the yokes 11, 12 and 15, and the field is cultivated, after which the cultivators are removed and grain drills are attached to the frame in their places, and the field is drilled with the grain.

By the provision of the pivoted evener bars 44 and 45, and the flexible members 48, 49 and 50, which are connected thereto, the draft of the implement will be equalized, so that each horse will pull its share of the load.

The foot levers 36 and the hand levers 30 permit of the lateral adjustment of any one of the agricultural implements independent of the other, as conditions may require, and all of the implements are moved vertically by the operation of the rock shaft 19.

From the foregoing description, taken in connection with the accompanying drawings, the advantages of the construction and of the method of operation of the improved agricultural implement frame will be readily apparent to those skilled in the art to which this invention appertains, and while in the foregoing description, the principle of the operation of this invention has been described, together with various features of construction, it is to be understood that certain minor features of construction, combination and arrangement of parts may be altered to suit practical conditions provided such alterations are comprehended within the scope of what is claimed.

What is claimed is:

In an agricultural implement structure, a supporting frame, means connecting an agricultural implement to said frame, means carried by said frame for moving said implement vertically independently of movement of the frame, said implement being disposed to provide outer implements and an intermediate implement, and handles attached to the outer sides of the outer implement and extending upwardly and curving over said supporting frame whereby said outer implement may be moved independently of movement of the intermediate implement.

In testimony whereof I affix my signature in presence of two witnesses.

HARRY E. VANDERLIP.

Witnesses:
E. M. SMITHER,
J. L. SMITHER.

Copies of this patent may be obtained for five cents each, by addressing the "Commissioner of Patents, Washington, D. C."